(12) United States Patent
Wang et al.

(10) Patent No.: US 11,247,205 B2
(45) Date of Patent: Feb. 15, 2022

(54) SURFACE-MODIFIED INTERFACES OF PNEUMATIC VALVES WITH ENHANCED ELECTRICAL PROPERTIES

(71) Applicant: ARIZONA BOARD OF REGENTS ON BEHALF OF THE UNIVERSITY OF ARIZONA, Tucson, AZ (US)

(72) Inventors: Xuemin Wang, Tucson, AZ (US); Christopher Baker, Knoxville, TN (US); Craig A. Aspinwall, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 15/953,783

(22) Filed: Apr. 16, 2018

(65) Prior Publication Data

US 2018/0297029 A1   Oct. 18, 2018

Related U.S. Application Data

(60) Provisional application No. 62/485,834, filed on Apr. 14, 2017.

(51) Int. Cl.
*B01L 3/00* (2006.01)
*F16K 99/00* (2006.01)

(52) U.S. Cl.
CPC ... *B01L 3/502707* (2013.01); *B01L 3/502715* (2013.01); *B01L 3/502738* (2013.01);
(Continued)

(58) Field of Classification Search
CPC .. B01L 3/502707; B01L 3/5027; B01L 3/502; B01L 3/50; B01L 3/502715;
(Continued)

(56) References Cited

U.S. PATENT DOCUMENTS

2004/0209354 A1* 10/2004 Mathies .............. B01L 3/50273
435/287.2
2011/0195260 A1*  8/2011 Lee ........................... C09J 5/00
428/447
2013/0203634 A1*  8/2013 Jovanovich ....... B01L 3/502738
506/26

OTHER PUBLICATIONS

Ogilvie, Chemically resistant microfluidic valves from Viton® membranes bonded to COC and PMMA, Lab Chip, 2011, 11, 2455 (Year: 2011).*

(Continued)

*Primary Examiner* — Christine T Mui
(74) *Attorney, Agent, or Firm* — Nguyen Tarbet LLC

(57) ABSTRACT

Surface-modified glass and polymer membrane interfaces form high-electrical resistance seals that can be used in microfluidic valves and array devices tailored for electrophysiological measurements. The incorporation of high seal resistance valves into the array device allows only the desired electrophysiological signal to be detected by a patch clamp amplifier, enabling parallel experiments with one patch clamp amplifier, which can greatly improve the cost efficiency. To achieve the desired high seal resistance, surface modification was performed on the glass components to increase the interaction between the glass and the membrane surfaces. The valves exhibit seal resistance of >500 GΩ after modification, which is 100× higher than reported for unmodified valves.

12 Claims, 12 Drawing Sheets

(52) U.S. Cl.
CPC ...... *F16K 99/0015* (2013.01); *F16K 99/0042* (2013.01); *B01L 2200/027* (2013.01); *B01L 2200/0689* (2013.01); *B01L 2300/0645* (2013.01); *B01L 2300/0663* (2013.01); *B01L 2300/0887* (2013.01); *B01L 2400/0638* (2013.01); *F16K 2099/0073* (2013.01); *F16K 2099/0074* (2013.01)

(58) Field of Classification Search
CPC .......... B01L 3/502738; F16K 99/0015; F16K 99/0003; F16K 99/0001; F16K 99/00; F16K 99/0042
USPC .......................................... 422/502, 50, 500
See application file for complete search history.

(56) References Cited

OTHER PUBLICATIONS

Bright, Decreased aperture . surface energy enhances electrical, mechanical, and temporal stability of suspended lipid membranes, ACS Appl Mater Interfaces. Nov. 27, 2013; 5(22): 11918-11926 (Year: 2013).*

Grover, Monolithic membrane valves and diaphragm pumps for practical large-scale integration into glass microfluidic devices, Sensors and Actuators B, 2003, 89, 315-323. (Year: 2003).*

* cited by examiner

Perfluorodimethylchlorosilane (PFDCS)

Octyldimethylchlorosilane (ODCS)

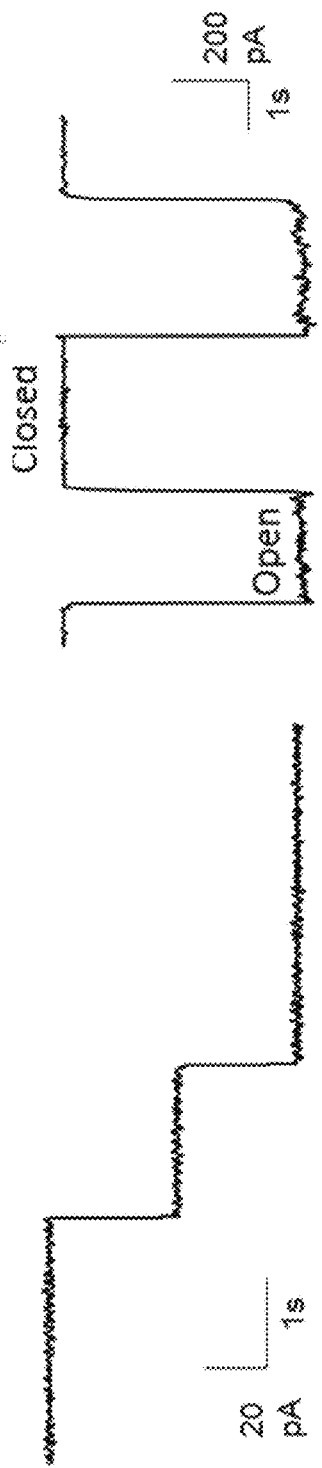
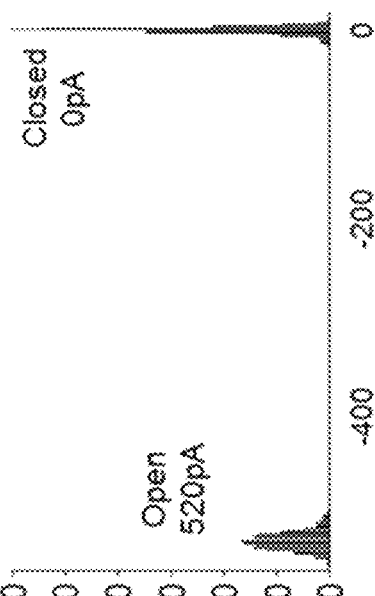
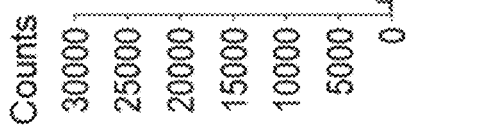
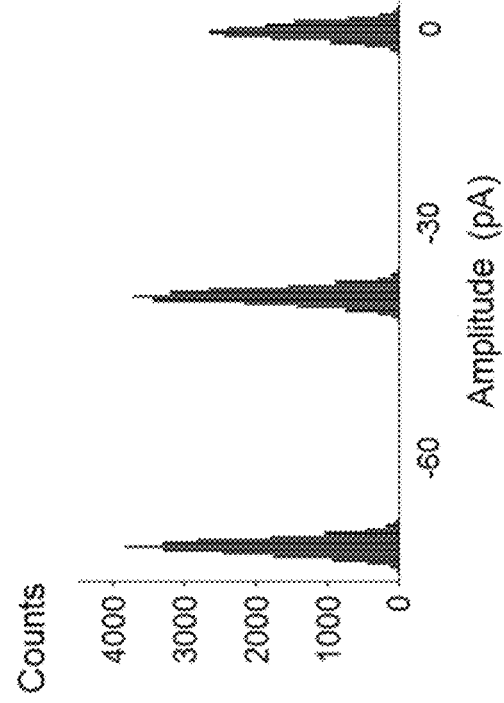
FIG. 13A
FIG. 13B
FIG. 13C
FIG. 13D

SURFACE-MODIFIED INTERFACES OF PNEUMATIC VALVES WITH ENHANCED ELECTRICAL PROPERTIES

CROSS REFERENCE

This application claims priority to U.S. Provisional Patent Application No. 62/485,834, filed Apr. 14, 2017, the specification(s) of which is/are incorporated herein in their entirety by reference.

GOVERNMENT SUPPORT

This invention was made with government support under Grant Nos. R01 EB007047 and R01 GM095763 awarded by NIH. The government has certain rights in the invention.

FIELD OF THE INVENTION

The present invention relates to high electrical resistance interfaces that can be used in microfluidic and other micromechanical devices and systems. Said valves may be utilized in microfluidic electrophysiological arrays, microfluidic networks, and microfluidic/electronic interfaces. A key demonstration utilizing microfluidic surface-modified glass/polydimethylsiloxane pneumatic valves with enhanced opening capabilities and improved electrical and fluidic resistance is presented.

BACKGROUND OF THE INVENTION

Over the last three decades, significant research efforts have focused on developing microfluidic systems for chemical analysis, including development of sensors and microfluidic array platforms. Miniaturized devices offer multiple advantages that are highly desirable in biomedical applications including, decreased sample and chemical consumption. Microfluidic systems also enable portable, cost effective, and high throughput analyses. Microfluidic systems have been widely used in biological analyses, such as polymerase chain reaction (PCR),[1-2] DNA analysis,[3-4] cell analysis,[5-6] and protein separation.[7-8] However, the development of fully intergraded miniaturized systems is limited by the development of microfluidic components with superior performances.[9] A key application of microfluidic devices is in the analysis of ion channel activity in cells and artificial membranes via integration of electrophysiological detection.

Ion channels are transmembrane proteins that regulate ion flux through cell membranes. They serve as transducers for extracellular and intracellular signals, and are activated upon varies events, such as ligand binding, potential changes, and mechanical stress. The malfunction of ion channels can lead to varies diseases such as epilepsy, muscle disorders, diabetes, cardiovascular diseases, and cancer. Ion channels are the second largest protein families that are targeted by pharmaceutical drugs on the market. As of 2016, 33% of the drugs on the market target GPCRs and 18% of the drugs target ion channels, which, together, accounted for more than half of the drug market. Functional assays to study ion channel activities have become increasingly important for drug discoveries and screenings. For example, fluorescence-based assays can detect the changes in either membrane potential or ion concentration resulting from ion flow through the channels. While said assays can have relatively high throughput, they are indirect measurements of ion channel activities and other biological events occurring in cells can interfere with results.

Electrophysiological recording is a powerful and informative tool for studying ion channel activities. It is commonly used to investigate the role of ion channels in their native environment. For example, patch clamp assays allow for direct, real-time study of ion channel activities by detecting ion flux through ion channels as current signals. However, patch clamp has several drawbacks including the interference from other ion channels in the cell membrane, unstable cell membrane patches, and loss of solution access to the intracellular side of the cells in whole cell configurations. Further still, obtaining electrophysiological recording is a labor intensive process resulting in its low throughput nature.

Alternatively, black lipid membrane (BLM) platforms have been explored as a substitute for cell membranes. BLMs have controlled and tunable bilayer compositions, which not only minimize interferences, but can also be utilized to increase membrane stability. Despite of its information-rich nature, a BLM assay is not widely used for early-stage drug screening due to its low throughput. Increasing effort has been put into developing BLM based array devices to fit the needs for high-thoughput screening (HTS) assays. However, most BLM array devices require one pair of electrodes for each BLM detection, which leads to the use of multiple amplifiers or electrical switches. The instrumentation cost for a multichannel patch clamp system is high, thereby limiting their use in certain settings: and the use of electrical switches requires extensive circuit building, which is limited to the available expertise in electronics, Hence, there remains a need for improved assays that are relatively inexpensive and have high throughput.

Microfluidic valves are essential components of integrated microfluidic systems and provide key control over fluidic resistance. Microfluidic valves can be used alone or in serious to form micro-pumps to provide various types of fluid control on chip to enable complex tasks, such as reliable sample injection,[10-11] reagent mixing,[12-13] sample sorting[14-15] and fluid delivery.[16-17] The large variety of valve designs allows these miniaturized valves to be operated electrokinetically,[18-19] pneumatically,[20-21] and thermally,[22-23] to name a few, which greatly broadened their versatility and application.

A key limitation of existing microfluidic valves is the limited electrical resistance of the valve interface. Detection of low electrical currents ($\leq$10 pA) from individual ion channels requires the introduction of a high electrical resistance seal to isolate ion flux through the device. The interface between the microfluidic valve seat and the flexible membrane utilized to open and close the valve comprises a glass or polymer surface that contains a ca. 1 nm thick water layer which is not completely excluded upon contact with the polymer valve membrane. This causes significant leakage of ion current and thus the inability to detect low current signals. Specifically, the electrical resistances of common microfluidic valves have been reported between 2-10 G$\Omega$.[24-26] Although the resistance is in the G$\Omega$ regime, it is less than or equal to the resistance of an artificial lipid bilayer suspended across a hydrophobic substrate, which typically exceeds 10 G$\Omega$. For applications in which pico-amp current changes are measured, such as bioelectrochemistry, electrophysiology and single-electron transport, higher seal resistance is required. For example, in order to obtain high quality low noise ion channel recordings, the close resistance of the valve needs to be significantly higher than that of the BLM so that the resistance of the BLM becomes the limiting factor in the measurement, which would allow for any small changes in BLM resistance due to ion channel activities to be easily monitored.

In addition, the low electrical resistance is indicative of movement of small water soluble species through the valve interface, suggesting that small water soluble molecules may not be as readily blocked upon valve closure as the larger dye molecules currently used to evaluate valve permeability. Thus, for microfluidic application with low molecular weight analytes, tighter valve seals are warranted.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention describes an approach to increase the electrical resistance at a glass-polymer interface to greater than 500 GΩ, the current limitation of the instrumentation used to measure the resistance. In this invention, the glass surface is chemically modified with a hydrophobic or amphiphobic reagent to minimize the native water layer at the surface, thereby allowing for a tighter electrical seal to be formed upon contact with a polymer membrane. Without wishing to limit the invention to a particular theory or mechanism, the increased resistance lowers the minimum current that is detectable by up to 100×, thereby enabling detection of single ion channel currents.

In some aspects, the present invention features a high-electrical resistance interface comprising a first glass substrate having a glass surface modified with a silane covalently bonded to the glass surface, and a flexible polymer membrane interfacially contacting the silanized glass surface of the glass substrate. As compared to a non-surface-modified glass surface, the silane modification is effective for increasing a hydrophobicity or amphiphobicity of said glass surface and increasing an electrical resistance of the interface, thereby forming a high electrical resistance seal.

In other aspects, the present invention features a surface-modified microfluidic valve. The valve may comprise a first glass substrate, a flexible polymer membrane, and a second glass substrate. In some embodiments, the first glass substrate can have a first fluid channel and a second fluid channel disposed on an internal surface of the first glass substrate. The first fluid channel and the second fluid channel can be separated by a valve seat. In one embodiment, at least the internal surface of the first glass substrate and a seat surface of the valve seat may be modified with the silane. In other embodiments, the second glass substrate may comprise an internal surface, a displacement chamber disposed on the internal surface, and a vacuum conduit having a vacuum input disposed on an external surface of the second glass substrate. In one embodiment, the internal surface of the second glass substrate may be optionally modified with a silane.

In some embodiments, the membrane is sandwiched between the internal surfaces of the first and second glass substrates such that the displacement chamber is superimposed over the valve seat and a portion of the membrane. The portion of the membrane between the displacement chamber and the valve seat forms a diaphragm. Without wishing to limit the invention to a particular theory or mechanism, the silane modification is effective for increasing a hydrophobicity of the silanized surfaces and increasing an electrical resistance of the valve as compared to a non-surface-modified microfluidic valve.

In some embodiments, the microfluidic valve may be biased to be in a closed position such that the valve seat is normally contacting the diaphragm, thereby forming a valve seal that obstructs flow between the first fluid channel and the second fluid channel. When a vacuum is applied to the displacement chamber via the vacuum conduit, the microfluidic valve is actuated into an open position such that the diaphragm is pulled away from the valve seat and into the displacement chamber, thereby breaking the valve seal and allowing for flow between the first fluid channel and the second fluid channel. Positive pressure can be applied to the microfluidic valve via the vacuum conduit to maintain the closed position and to close the microfluidic valve after opening.

In other embodiments, the microfluidic valve may be biased to be in a normally open position such that a gap exists between the diaphragm and the valve seat. When a positive pressure is applied to the displacement chamber, the microfluidic valve is actuated into a close position, where said pressure causes the diaphragm to be pressed against and contact the valve seat, thereby forming a seal that obstructs flow between the first fluid channel and the second fluid channel. When the positive pressure is removed, the diaphragm returns to its resting state, which breaks the seal and forms the gap, thus the valve returns to its open state where fluid flows between the first fluid channel and the second fluid channel.

In some aspects, the modified three-layer diaphragm valve was selected for its potential for high close resistance due to its resting geometry, as well as the ease of operation and the ease of integration into more complicated devices. The fluidic valves of the present invention possess high electrical insulating abilities and are capable of being modulated for electrochemical measurements in multiplexed devices. The unique combination of high electrical resistance (>10× higher than previously reported) and rapid opening times make this feasible. The enhanced opening times can be useful in additional microfluidic and MEMS applications where rapid fluidic valving is necessary, including fluid delivery and mixing, such as those used in on-chip nucleic acid sequencing, micro total analysis systems, etc.

In other aspects, it is an objective of the invention to provide for microfluidic array devices that can be used to allow for parallel testing, which will improve the throughput. In one embodiment, the present invention features a microfluidic array device comprising one amplifier operatively connected to at least one electrode, and a plurality of microfluidic valves. The microfluidic valves can be according to any of the valves described herein. In one embodiment, each of the first fluid channels can be fluidly connected to a single input port that is configured to receive the electrode. Each microfluidic valve may be uniquely assigned to one or more array elements of the device. Without wishing to limit the invention to a particular theory or mechanism, modulating the opening and closing of each microfluidic valve can enable an electrophysiological recording of each individual array element to be obtained using the single amplifier. In some embodiments, the one or more array elements are black lipid membranes (BLM) that are each suspended from a microaperture. The microaperture can be disposed in a solution reservoir that is fluidly connected to at least one of the second fluid channels. In other embodiments, the black lipid membranes may comprise ion channels that are embedded in the membrane.

In some embodiments, a BLM array device of the present invention requires the use of only one patch clamp amplifier and minimum circuit wiring. The device may comprise multiple parallel channels, and one BLM will be formed above each channel across an individual micro-aperture. With one electrode placed on either side of the BLM, the amplifier can detect current signals from all the channels combined. To differentiate the signal coming from each individual channel, micro-valves are utilized to isolate electrical access of all other channels to the electrodes while leaving only one channel under detection connected at a time. A fast switch in valve conformation will allow a quick switching between detectable channels.

One of the unique and inventive technical features of the present invention is the surface modification of the valve. Without wishing to limit the invention to any theory or mechanism, it is believed that this technical feature can advantageously increase the hydrophobicity of the glass substrate, which would result in the elimination of an aqueous layer retained between the glass and the PDMS due to the hydrophilic nature of the glass, thereby increasing the valve's resistance. In one embodiment of the invention, a significant increase in closed valve resistance was observed after surface modification, and the valve was successfully used in isolating current signal detected from α-hemolysin (α-HL) insertions into the BLM. None of the presently known prior references or work has the unique inventive technical feature of the present invention.

BRIEF DESCRIPTION OF THE DRAWINGS

The features and advantages of the present invention will become apparent from a consideration of the following detailed description presented in connection with the accompanying drawings in which:

FIG. 2A shows an assembled view of the valve design. FIG. 2B shows an exploded view of the valve. A PDMS diaphragm is sandwiched between a glass displacement chamber layer and a glass fluid channel layer. A male luer fitting and a PTFE washer are used as solution reservoirs, in which Ag/AgCl electrodes are placed during measurements. FIG. 2C is a side view of the valve. When vacuum is applied to the displacement chamber, the PDMS diaphragm is pulled up, thereby allowing electrical signal to pass through. Conversely, when pressured is applied to the chamber, the PDMS is pushed against the valve seat, thereby blocking the signal. FIG. 2D is a side view of the valve that is normally in an open position.

FIGS. 13A-13D show a non-limiting example valve operation to isolate electrophysiological signals. FIG. 13A is a single channel recording. FIG. 13B is an all point histogram of the first two α-hemolysin insertions at a −40 mV holding potential. Each insertion resulted in a −40 pA increase in current signal. FIG. 13C shows a current recording. FIG. 13D is an all point histogram of valve operation with α-hemolysin already inserted into the BLM at a −40 mV holding potential. The population at −520 pA was the current signal resulting from 13 α-hemolysin insertions when the valve was open. When the valve was closed, the detectable current is 0 pA.

DESCRIPTION OF PREFERRED EMBODIMENTS

Figure 1A:
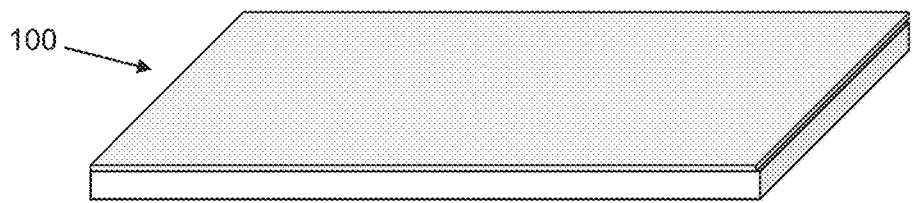
FIG. 1A shows a non-limiting embodiment of a surface-modified seal the present invention.

Following is a list of elements corresponding to a particular element referred to herein:

100 seal 105 microfluidic valve
110 first glass substrate
112 surface of first glass substrate
114 first fluid channel
116 second fluid channel
118 valve seat
119 seat surface
120 silane modification
130 second glass substrate
132 surface of second glass substrate
134 displacement chamber
140 membrane
142 diaphragm
144 valve seal
146 gap
150 vacuum conduit
152 vacuum input
156 input port
200 microfluidic array device
205 solution reservoir
207 microaperture
210 amplifier
220 electrode
230 array element Microfluidics is the science of manipulating and controlling fluids usually on the scale of microliters ($10^{-6}$) to picoliters ($10^{-12}$) and that are contained within sub-millimeter scale channels or platforms. Typically, a microfluidic device or system can have interconnected channels and chambers through which materials, such as fluids and vapors, can be transported using pumps and valves that control flow. The structural or functional features may be dimensioned on the order of mm-scale or less. For example, a diameter of a channel or dimension of a chamber may range from <0.1 µm to greater than 1000 µm. Alternatively or in addition, a length of a channel or chamber may range from 0.1 µm to greater than cm-scale. Microfluidic devices and systems enable the use of smaller volumes of reagents, samples, and other fluids when performing experiment and analysis of sample, thus significantly reducing operational costs. Mirofluidic devices are also readily automated. Microfluidics may be used in a wide range of applications, including, but not limited to, biological, biochemical, or chemical analysis and detection methods, high throughput screening, research, diagnosis, environmental assessment and the like.

As used herein, the term "valve" refers to a device or component that can controls flow of a material. For example, actuation of the valve in a microfluidic device can control flow through the channels and chambers by creating and removing seals or blockages. Examples of microfluidic valves include, but are not limited to, screw microvalves, solenoid microvalves, and pneumatic microvalves.

As used herein, the electrical resistance of the seal was measured by first applying an increasing voltage ranging from −100 mV to 100 mV across the closed seal in 10 mV increments. Then, the data was graphed as a current vs. voltage plot, and the resistance was calculated as the inverse of the slope from a $1^{st}$ order, best-fit line.

As known to one of ordinary skill in the art, the term "noise" may refer to an undesired disturbance in an electrical signal level. The noise detected in a microfluidic device may arise from fluids in the device, mechanical instabilities, thermal changes, and pressure changes to the microfluidic system. The noise level in the present invention was analyzed by calculating the root-mean-square (rms) noise over one second of steady-state current at both open and closed valve configurations. Current traces were obtained using 0.5 mV/pA gain to avoid signal saturation when the valve was open.

As known to one of ordinary skill in the art, a "contact angle" is a measure of the wettability of a surface or material. In one aspect, the contact angle is the angle formed between the surface and a liquid droplet. Generally, when water is used as the liquid, the smaller the contact angle (<<90°), the more hydrophilic the surface; and conversely, the larger the contact angle (>>90°), the more hydrophobic the surface.

According to one embodiment, it is an objective of the present invention to provide a high-resistance, surface-modified seal that may be used in microfluidic applications, such as microfluidic valves, microfluidic array devices, microfluidic pumping, microfluidic networks, or microfluidic/electronic interfaces. For example, electrophysiological sensor arrays may be used to obtain readouts of individual array elements. These readouts occur via modulation of a valve having a highly insulating seal integrated within a microfluidic channel that is uniquely assigned to one or more array elements. Thus, by modulating the opening and closing of individual valves, unique array elements can be probed with the use of a single amplifier.

The microfluidic valves with high electrical resistance can provide a cost-efficient alternative for conducting parallel electrophysiological experiments. As will be described in later examples, valves with different surface modifications were characterized and compared in terms of electrical resistance, opening and closing time, valve stability, and noise evaluation. Upon surface modification, the electrical resistances of the valves were greatly enhanced from 7 GΩ to greater than 500 GΩ, with decreased noise level, good stability, and fast opening and reasonable closing times. The performance of the surfaced modified valve was evaluated with electrophysiological signals due to α-hemolysin insertions. The modified valve successfully blocked α-hemolysin signal during electrophysiological measurements such that a detectable current after valve closing was beyond the detection limit of the patch clamp system, which demonstrates its utility to be incorporated into electrophysiological microfluidic array devices.

Figure 1B:
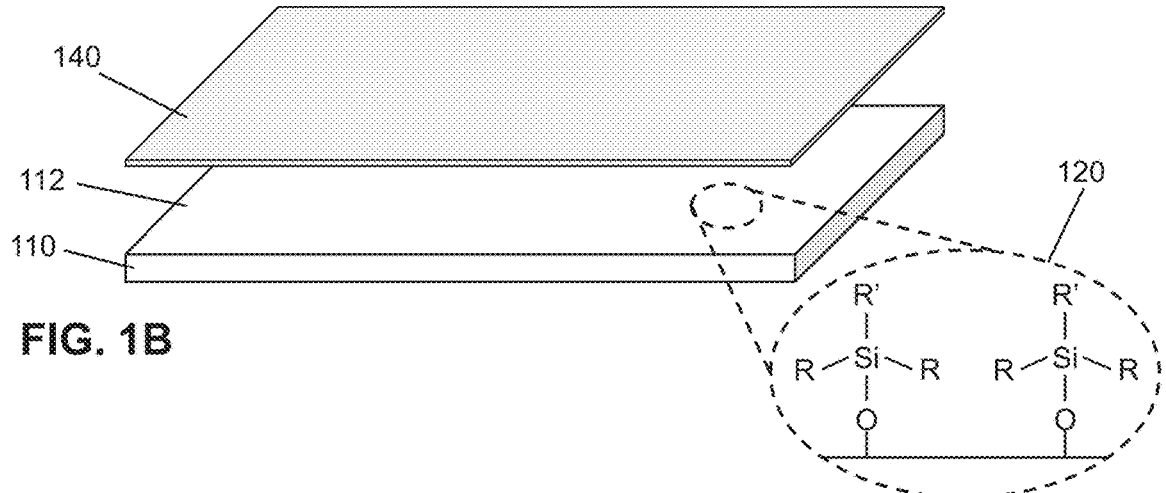
FIG. 1B shows an exploded view of the surface-modified seal having glass surface modification.
Figure 1C:
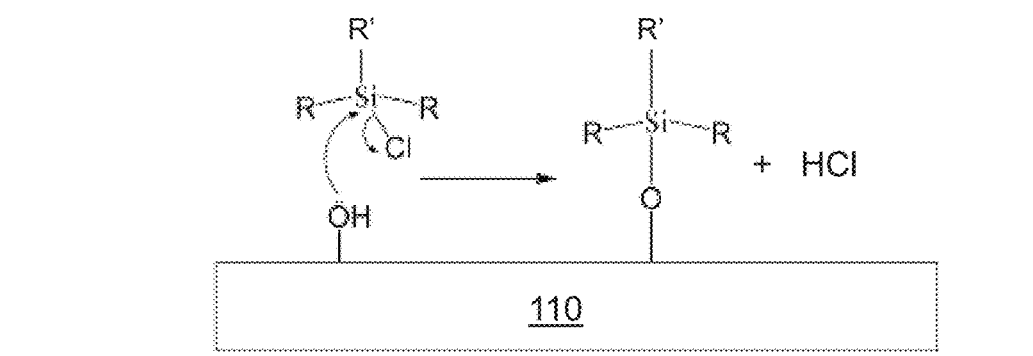
FIG. 1C is a non-limiting schematic of the glass surface modification. The glass surface was modified with octyldimethylchlorosilane (ODCS) and tridecafluoro-1,1,2,2-tetrahydrooctyldimethylchlorosilane (PFDCS) to increase hydrophobicity.
Figure 1C:
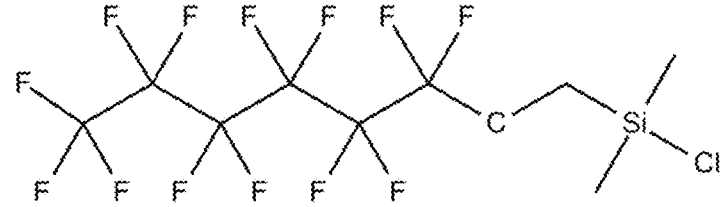
Figure 1C:
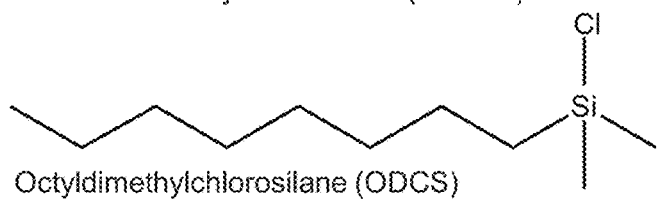

Referring now to FIGS. 1A-1C, in one embodiment, the present invention features a seal (100) comprising a glass surface (112) having a silane (120), and a membrane portion (140) disposed adjacent to said glass surface (112). When the membrane portion (140) mates with the glass surface (112), the seal is formed. In another embodiment, the seal may further comprise a second glass surface (132). The second glass surface (132) may be disposed adjacent to the membrane portion (140) such that the membrane portion (140) is interposed between the glass surfaces (112, 132). In this embodiment, the seal is formed when the membrane portion (140) mates with the modified glass surfaces (112, 132). In other embodiments, the second glass surface (132) may optionally have the silane (120). Without wishing to be bound to a particular theory, the silane (120) may be effective for increasing a hydrophobicity of the glass surface (s) and increasing an electrical resistance of the seal as compared to a non-surface-modified seal.

Figure 5:
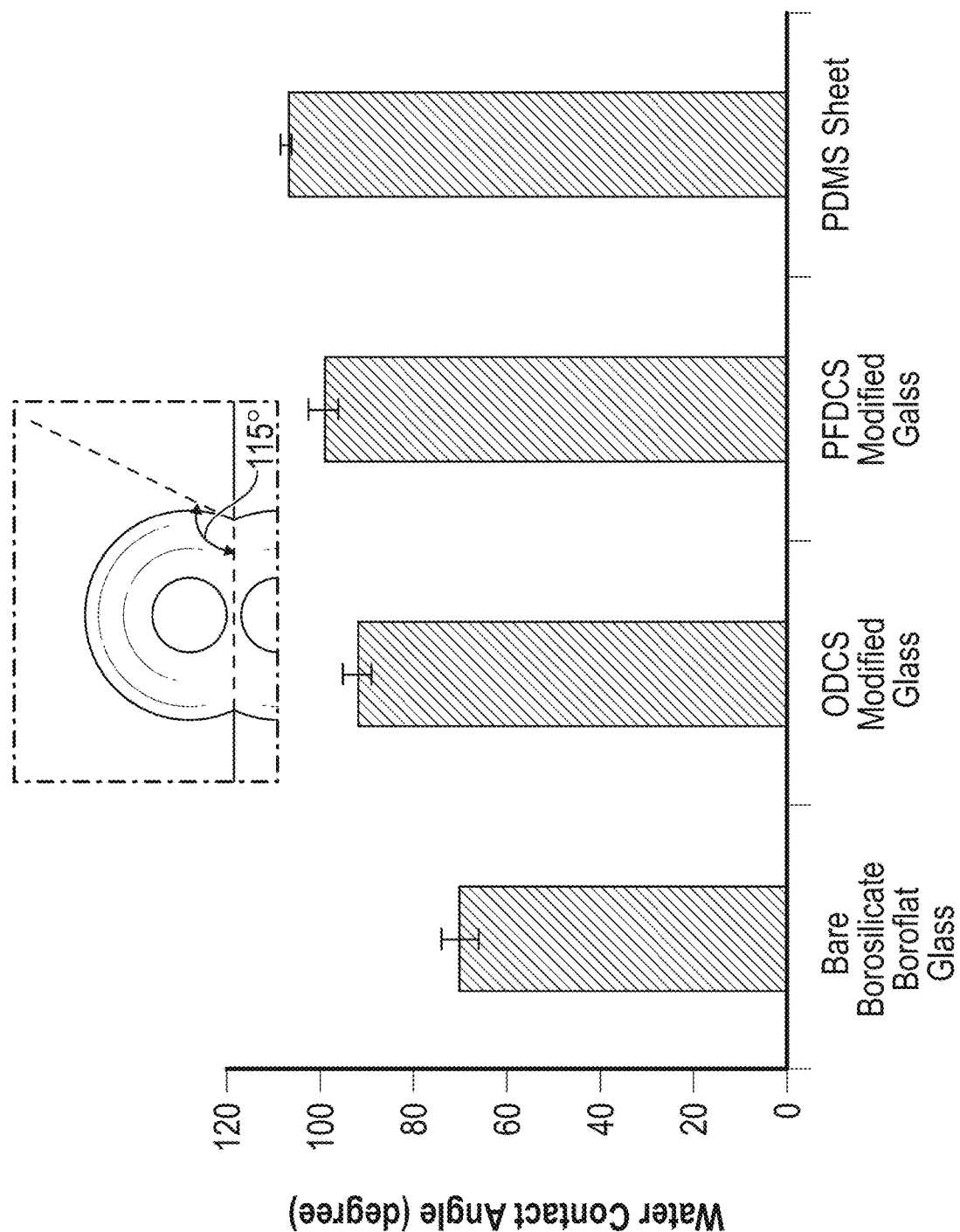
FIG. 5 shows non-limiting examples of water contact angle for different substrates. A valve glass, after all the fabrication processes, has a water contact angle of about 70±4°. A PDMS diaphragm has a water contact angle of about 107±1°. The water contact angle of the glass substrate was increased to about 92±3° and about 99±3° after surface modification with ODCS and PFDCS, respectively.

As show in FIG. 1C, the silane may be covalently bonded to the glass surfaces. Non-limiting examples of the silane include octyldimethylchlorosilane, tridecafluoro-1,1,2,2-tetrahydrooctyldimethylchlorosilane, long-chain dimethyl chlorohydrocarbon silanes where the hydrocarbon can be a $C_6$-$C_{20}$ (e.g. hexyl, octyl, decyl, etc.), dimethyl chloroperflourinated silanes and corresponding dichloromethyl and trichloro silane variants such as octyldimethylchlorosilane, octylmethyl dichlorosilane, octyl trichlorosilane, etc, and other variants where different R groups replace the octyl. In preferred embodiments, the surfaces may be modified with any silane that is effective for imparting a water contact angle greater than 90° to the glass surface. In some embodiments, the silanized surfaces can have a water contact angle ranging from about 90° to about 125°. For example, as shown in FIG. 5, the water contact angle may be about 90°-100°. In other preferred embodiments, the silane may be selected such that it causes the silanized glass surface to have a water contact angle that is similar to the water contact angle of the membrane. For instance, the water contact angle of the silanized glass surface may be within 20° from the membrane water contact angle.

In some embodiments, the membrane portion (140) may be a flexible polymer. Examples of the polymer include, but are not limited to, polydimethylsiloxane (PDMS), polytetrafluoroethylene, polybutylmethacrylate, and other related polymethacrylates.

In some preferred embodiments, the electrical resistance of the microfluidic valve may be at least 500 GΩ. For example, the electrical resistance of the seal may be about 500 GΩ to about 2500 GΩ. In more preferred embodiments, the electrical resistance of the microfluidic valve may be greater than 500 GΩ.

In other embodiments, the seal can have a noise level less than 50 pA. In still other embodiments, the seal can have a noise level less than 20 pA. In some embodiments, the seal can have a noise level ranging from about 1 pA to about 20 pA. For instance, the seal can have a noise level of about 10 pA.

In some preferred embodiments, the high electrical resistance seal (100) may be used in a microfluidic system that measures an electrophysical property of a fluid. Examples of microfluidic systems include, but are not limited to, microfluidic array devices, microfluidic chips, microfluidic pumping systems, microfluidic networks, and microfluidic/electronic interfaces. For example, as shown in FIGS. 2A-2D, the seal (100) may be disposed in a valve (105). In one embodiment, the valve (105) may comprise a first fluid channel (114), a second fluid channel (116), and a valve seat (118) disposed on the first glass surface (112), and a displacement chamber (134) recessed into the second glass surface (132).

In some embodiments, the valve seat (118) separates the first fluid channel (134) and a second fluid channel (136). In other embodiments, the valve seat (118) may have a flat or curved seat surface (119). In one embodiment, the displacement chamber (134) is superimposed over the membrane portion (140) and the valve seat (118). In some embodiments, the displacement chamber (134) may be concaved or cylindrical-shaped recess.

In some preferred embodiments, the microfluidic valve (105) is biased to be in a closed position such that the valve seat (118) is normally contacting the membrane portion (140), thereby forming the seal (100) to obstruct flow between the first fluid channel (114) and the second fluid channel (116). In some embodiments, the silanized seat surface of the valve seat lies on a same plane as the internal surface of the second glass substrate.

Figure 2A:
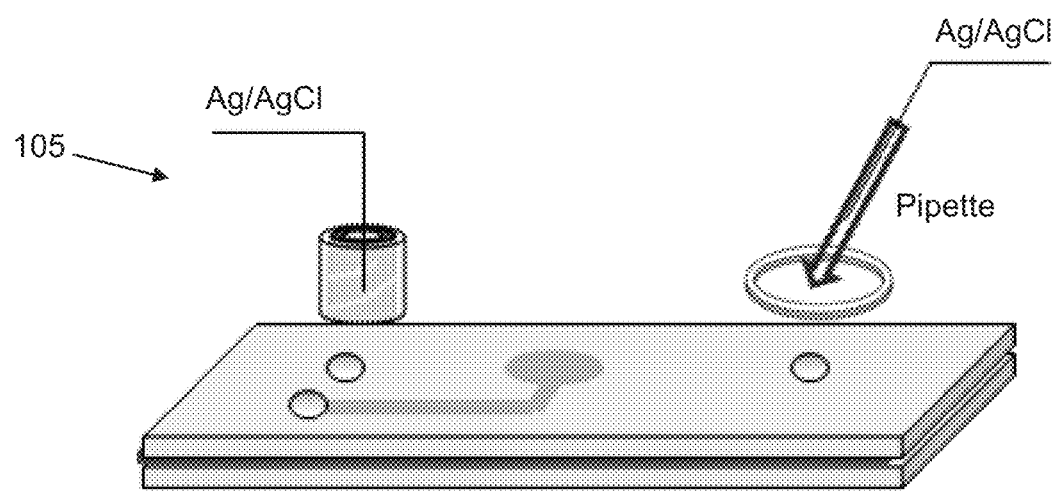
FIGS. 2A-2D show a non-limiting example of a glass/PDMS pneumatic valve.
Figure 2B:
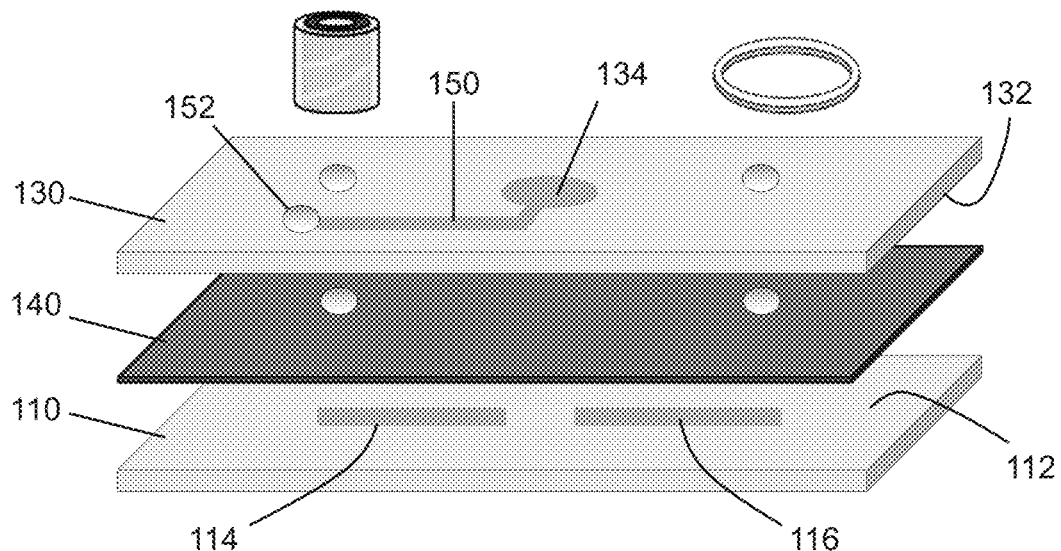
Figure 2C:
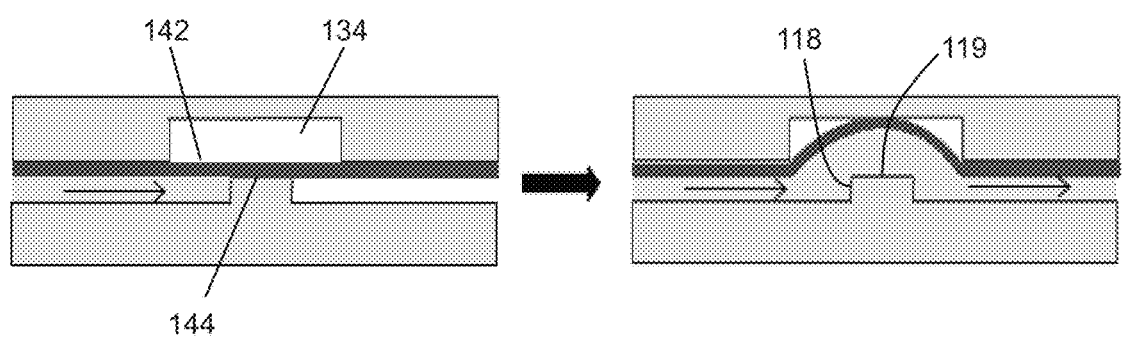

Consistent with the normally closed valve embodiment, the valve (105) may further comprise a vacuum conduit (150) having a vacuum input (152) and being fluidly coupled to the displacement chamber (134). Referring to FIG. 2C, when a vacuum is applied to the displacement chamber (134) via the vacuum conduit (150), the valve (105) is actuated into an open position such that the membrane portion (140) is pulled away from the valve seat (118) and into the displacement chamber (134), thereby breaking the seal (100) and allowing for flow between the first fluid channel (114) and the second fluid channel (116). When positive pressure is applied to the displacement chamber (134) via the vacuum conduit (150), the valve (105) returns to the closed position.

Figure 7:
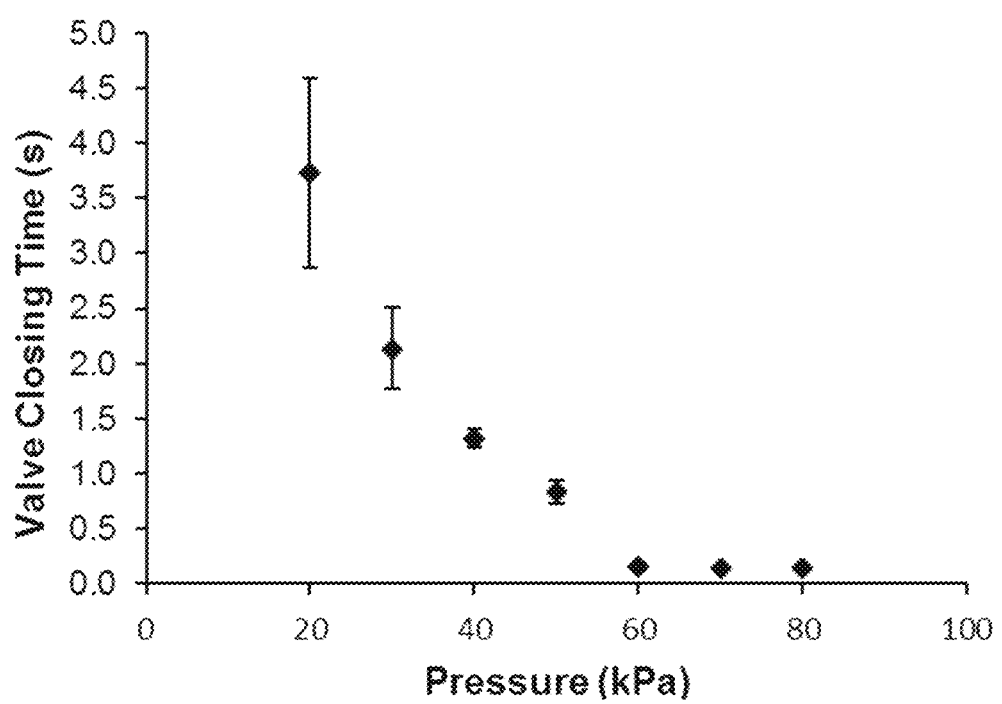
FIG. 7 is a plot of valve closing time vs. applied pressure for an unmodified valve. Valve closing time decreases with increasing pressure, and levels off at 60 kPa. The higher the applied pressure, the easier it will be for gas bubbles to be introduced into the fluid channel; therefore, 60 kPa was used to close the unmodified valves. To make all the valve measurements consistent and comparable, 60 kPa was also used to close the surface modified valves.

In some embodiments, when the vacuum is applied to the microfluidic valve, the valve has an opening time that may be less than 100 ms. For example, the opening time of the valve may be about 6 ms. When sufficient positive pressure is applied to close the valve, a closing time of the microfluidic valve can range from about 600-1500 ms. Referring to FIG. 7, the positive pressure may be at least as 60 kPa in order to have a relatively fast closing time, Referring to FIG. 10, in some embodiments, the valve closes is a step-wise fashion.

Figure 2D:
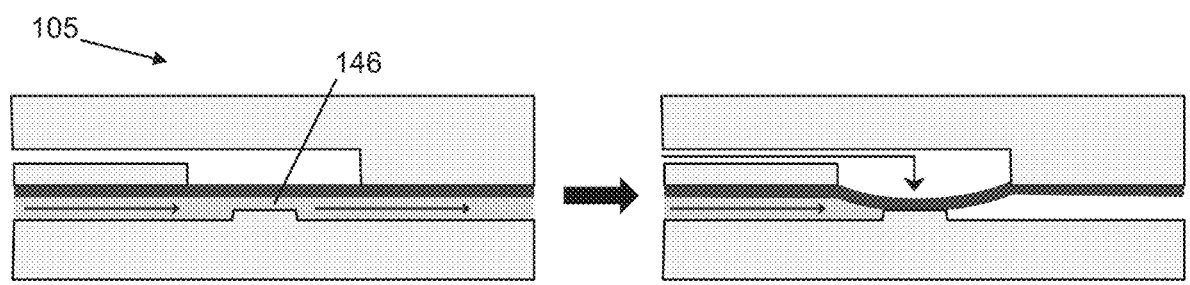

Referring to FIG. 2D, in other preferred embodiments, the microfluidic valve (105) is biased to be in an open position such that a gap (146) separates the valve seat (118) and the membrane portion (140) to allow flow between the first fluid channel (114) and the second fluid channel (116). In some embodiments, the valve (105) may further comprise a conduit (150) fluidly coupled to the displacement chamber (134). When a positive pressure is applied to the displacement chamber (134) via the conduit (150), the valve (105) can be actuated into a closed position such that the membrane portion (140) contacts the valve seat (118), thereby forming the seal (100) to block the flow between the first fluid channel (114) and the second fluid channel (116). When the positive pressure is removed, the valve (105) can return to the open position. For example, the membrane portion (140) returns to its resting state where it is separated from the valve seat (118) by a gap (146).

While the first glass substrate (110) may be silanized, the second glass substrate (110) may be optionally silanized. For example, the normally-closed valve may have a silanized first glass substrate (110) whereas the second glass substrate (130) is not silanized. In the embodiment of the normally-opened valve, both of the glass substrates (110, 130) may be silanized. In preferred embodiments, at least the portions of the glass surface that directly contacts a fluid is silanized.

Figure 12:
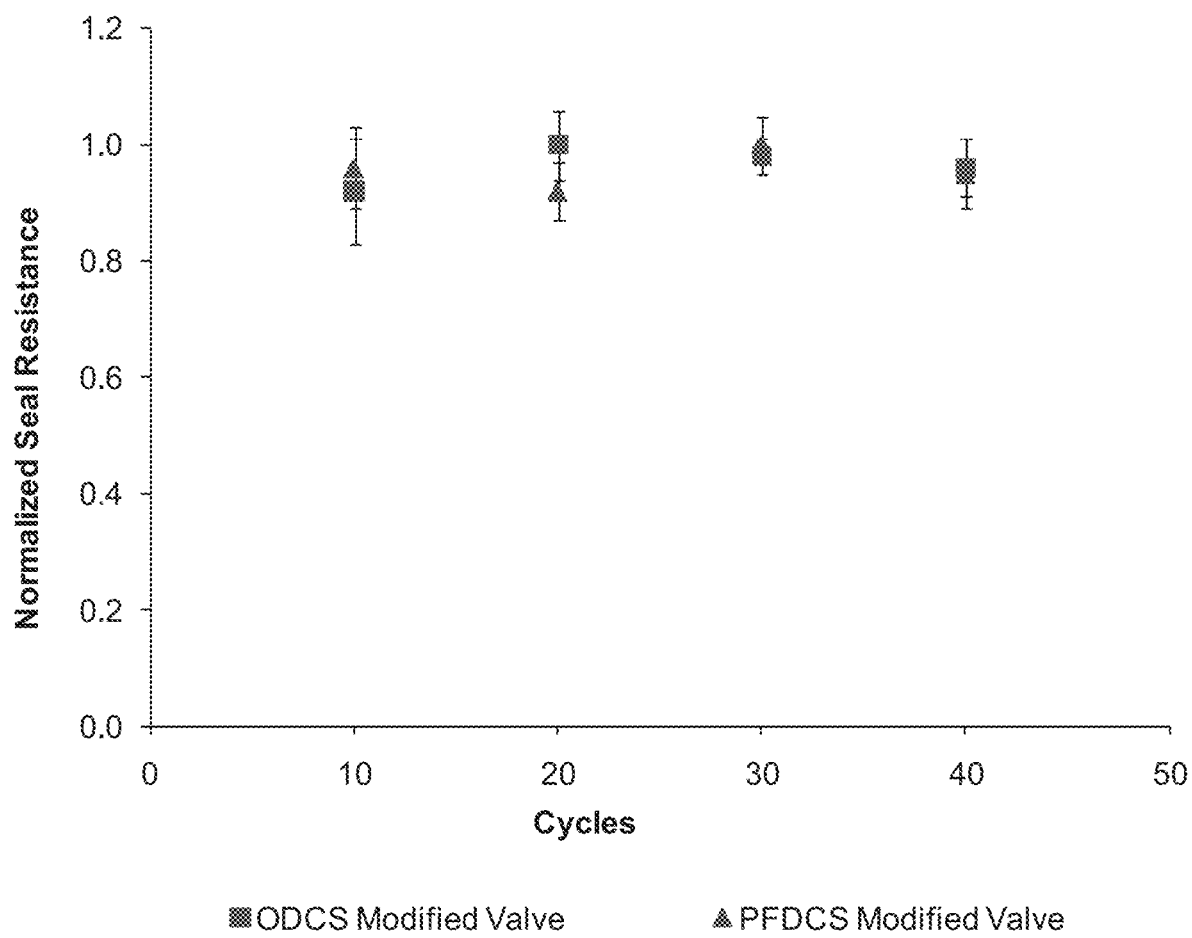
FIG. 12 shows the valve stability over cycles of operation. Electrical resistances of the surface-modified valves were measured after every ten cycles of valve operation. The resistances were then normalized to the highest resistance value measured for each type of valve. The results show that valve resistance is retained and stable for at least 40 cycles of operation.

In some embodiments, the electrical resistance of the seal is stable for at least 40 cycles of valve operation. As shown in FIG. 12, the stability of the seal refers to the electrical resistance of the seal in subsequent cycles being at least about 80% of the electrical resistance of the seal in the initial cycle. In some preferred embodiments, the seal is stable for at least 40 cycles such that the electrical resistance of the seal in subsequent cycles is at least about 90% of the electrical resistance of the seal in the initial cycle. In more preferred embodiments, the seal is stable for at least 40 cycles such that the electrical resistance of the seal in subsequent cycles is at least about 95% of the electrical resistance of the seal in the initial cycle.

Figure 4:
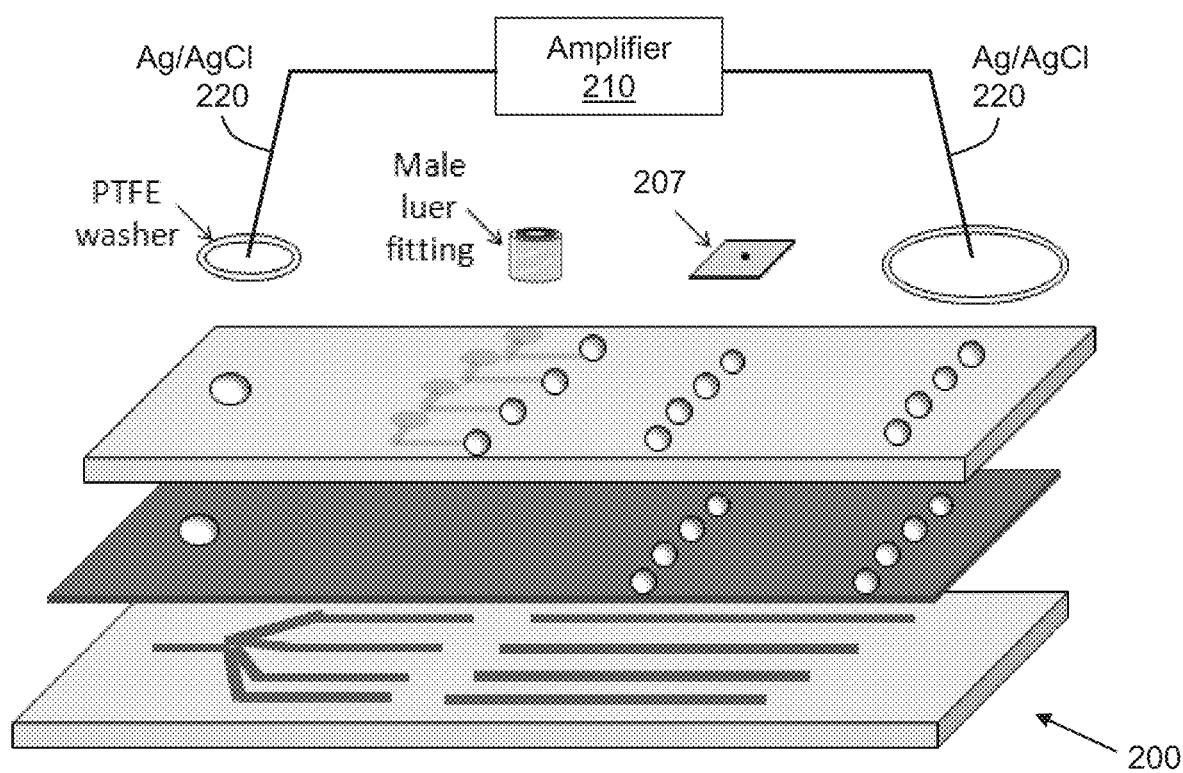
FIG. 4 shows a non-limiting embodiment of a BLM array device of the present invention. The device comprises multiple parallel channels. One BLM is formed above each channel across a micro-aperture. One electrode is placed in the PTFE washer, and the other electrode will be placed in the solution reservoirs right above the BLMs (not shown). Micro-valves with high electrical resistance are used to differentiate current signal coming from individual channels.
Figure 6:
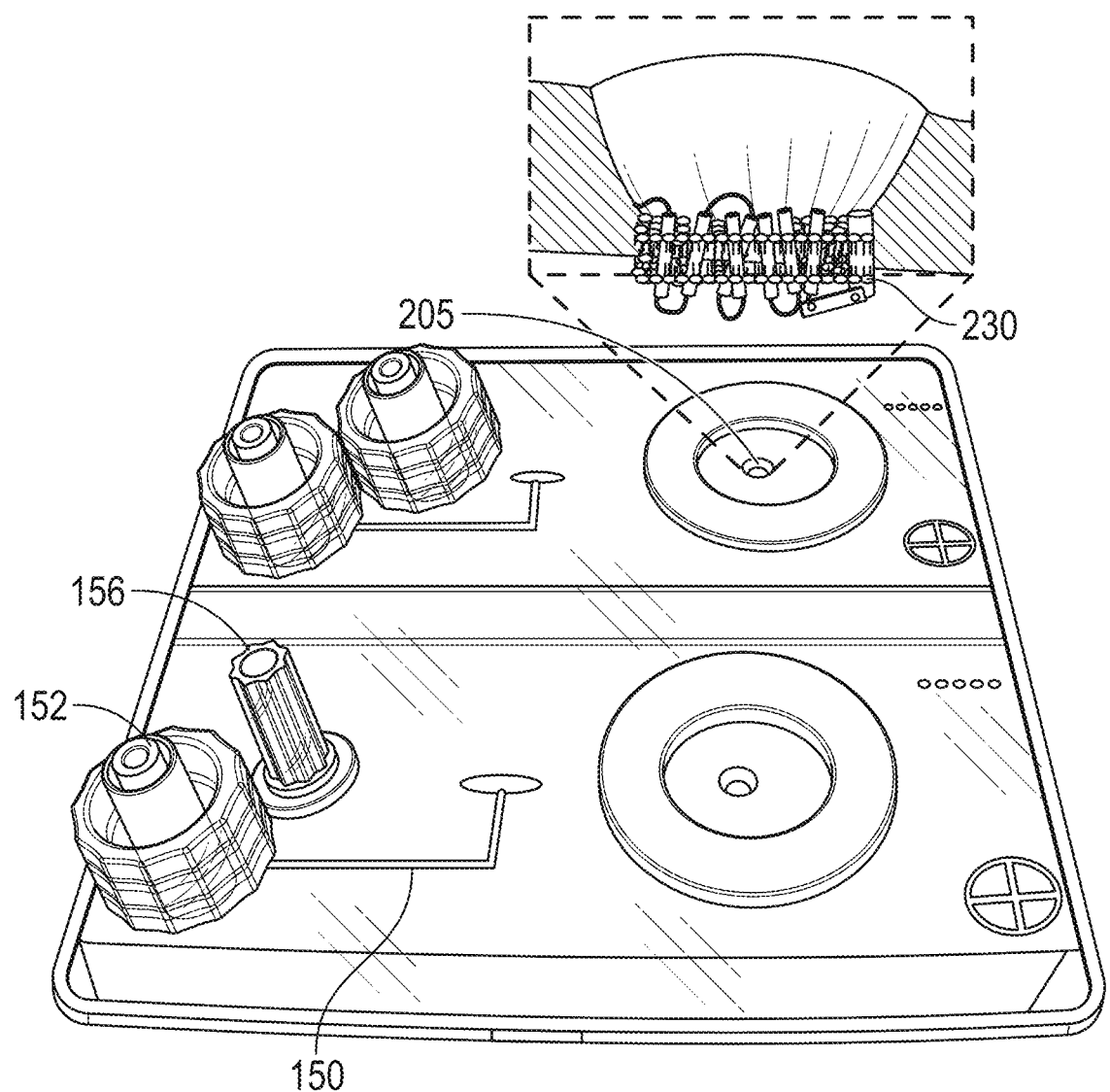
FIG. 6 shows a non-limiting embodiment of the present invention. Two valves on one glass slide were fabricated.

The valves described herein may be configured for use in a microfluidic system that measures an electrophysical property of a fluid. Non-limiting examples of the microfluidic system include microfluidic array devices, microfluidic chips, microfluidic pumping systems, microfluidic networks, and microfluidic/electronic interfaces. For example, in one embodiment, the valve may be used in a microfluidic array device (200). As shown in FIG. 4, in some embodiments, the microfluidic array device (200) may comprise at least one amplifier (210) operatively connected to at least one electrode (220), and a plurality of valves (105) in accordance with the valves described herein. Each of the valves (105) may be assigned to at least one array element (230) of the device. As used herein, the "array element" refers to an object, substrate, or platform that is being analyzed. For instance, as shown in FIG. 6, the array element (230) may be a black lipid membrane suspended across a microaperture (207). In some embodiments, the black lipid membrane may have ion channels embedded therein.

In some embodiments, each of the first fluid channels (114) may be fluidly connected to an input port (156) that is configured to receive the electrode (220). The array element (230) may be disposed in a solution reservoir (205). For example, the microaperture with the black lipid membrane may be disposed in (205) the solution reservoir. In some embodiments, the solution reservoir may be fluidly connected to at least one of the second fluid channels (116). For instance, the device may comprise one or more solution reservoirs such that each of the second fluid channels (116) may be fluidly coupled to its own reservoir. In one embodiment, a second electrode (220) may be disposed in the solution reservoir (205) and operatively coupled to the amplifier (210). By modulating the opening and closing of each valve (105), an electrical signal recording of the array element can be obtained using the amplifier and electrodes.

Figure 3:
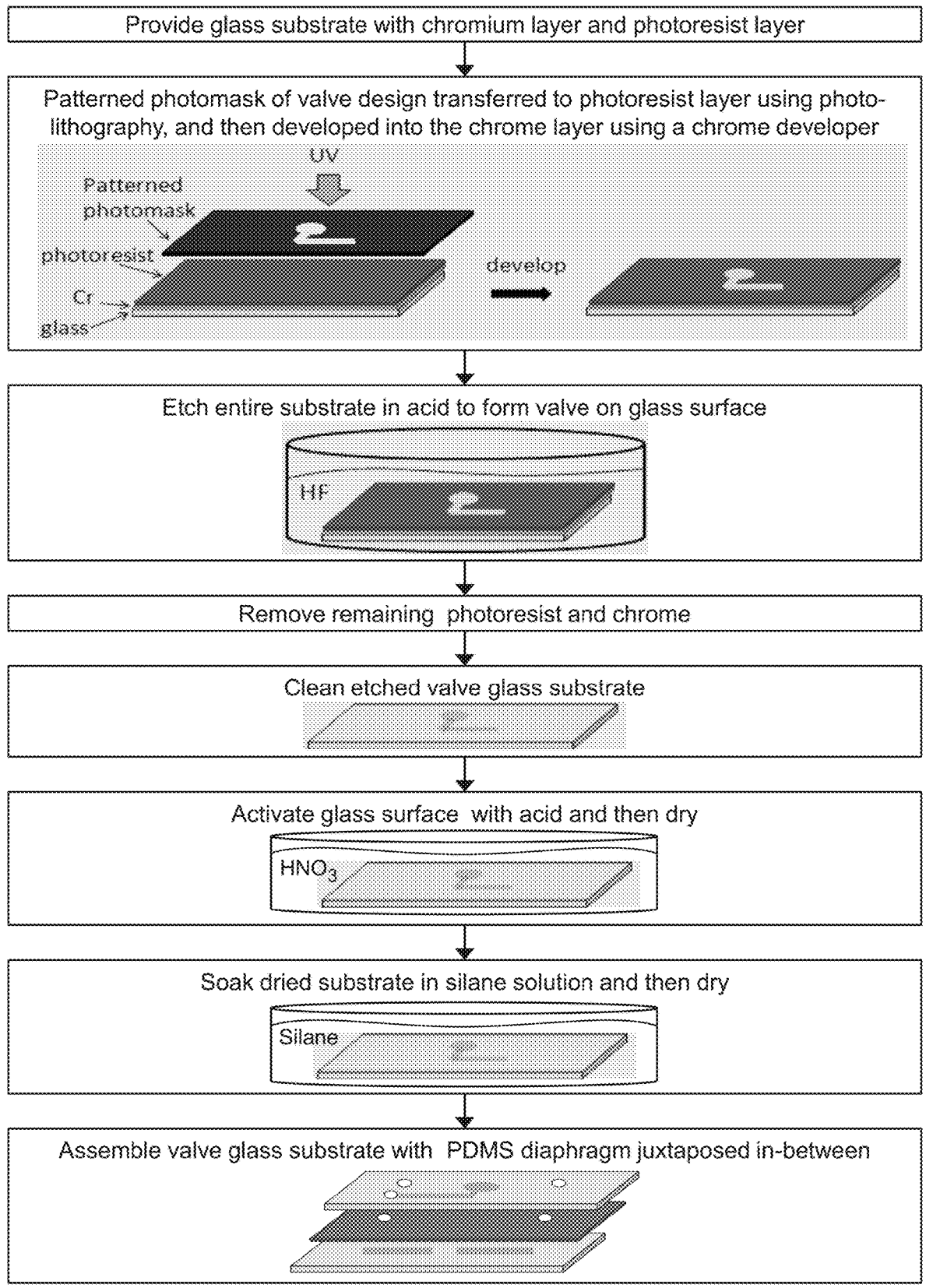
FIG. 3 shows a non-limiting procedure to prepare the surface-modified glass/PDMS pneumatic valve.

The microfluidic valves may be formed to have the high electrical resistance seal described herein. Thus, it is another objective of the present invention to provide methods for preparing microfluidic valves having a high electrical resistance seal. Referring now to FIG. 3, in one embodiment, the method may comprise providing a first glass substrate (110) and a second glass substrate (130), printing a first fluid channel (114) and a second fluid channel (116) on an internal surface (112) of the first glass substrate, where the first fluid channel (114) and the second fluid channel (116) are separated by a valve seat (118), and printing a displacement chamber (134) on an internal surface (132) of the second glass substrate, and a conduit (150) having an input (152) disposed on an external surface of the second glass substrate. In some embodiments, the printing step is accomplished by utilizing photolithography techniques, which are known to one of ordinary skill in the art.

In preferred embodiments, the method further comprises applying a silane to at least the internal surface (112) and a seat surface (119) of the valve seat of the first glass substrate. The silane may be optionally applied to at least the internal surface (132) of the second glass substrate. After modifying the glass surfaces with silane, the method continues with providing a flexible polymer membrane (140) and assembling the first glass substrate (110), the second glass substrate (130), and the membrane (140) such that the membrane (140) is interposed between the internal surfaces (112, 132) of the first and second glass substrates, thereby forming the microfluidic valve (105). Without wishing to limit the invention to a particular theory or mechanism, the silane modification step can increase a hydrophobicity amphiphobicity of the silanized surfaces and increase an electrical resistance of the microfluidic valve, as compared to a non-surface-modified microfluidic valve.

In some embodiments, the displacement chamber (134) may be superimposed over the valve seat (118) and a portion of the membrane, which forms a diaphragm. Typically, the microfluidic valve (105) may be biased to be in a closed position such that the diaphragm (142) is normally contacting the valve seat (118). This forms the high electrical resistance seal (100) that obstructs flow between the first fluid channel (114) and the second fluid channel (116). When a vacuum is applied to the displacement chamber (134) via the vacuum conduit (150), the valve (105) is actuated into an open position such that the diaphragm (142) is pulled away from the valve seat (118) and into the displacement chamber (134), thereby breaking the seal (100) and allowing for flow between the first fluid channel (114) and the second fluid channel (116).

Alternatively, the microfluidic valve (105) prepared by the methods described herein may be biased to be in an open position such that the valve seat (118) and the diaphragm (142) are separated by a gap (146). Thus, the fluid is normally flowing between the first fluid channel (114) and the second fluid channel (116). When a positive pressure is applied to the displacement chamber (134) via the vacuum conduit (150), the valve (105) is actuated into a closed position such that the diaphragm (142) is pressed against and contacts the valve seat (118). This forms the high electrical resistance seal (100) that obstructs flow between the first fluid channel (114) and the second fluid channel (116). By removing the positive pressure, the diaphragm (142) returns to its resting state, thereby breaking the seal (100) and opening the valve to allow for flow between the first fluid channel (114) and the second fluid channel (116).

EXPERIMENTAL EXAMPLE

The following is a non-limiting example of practicing the present invention. It is to be understood that the example described herein is presented for illustrative purposes, and is not intended to limit the invention in any way. Equivalents or substitutes are within the scope of the invention.

Materials

Chrome-coated Borofloat® borosilicate glass slides were purchased from Telic Inc (Valencia, Calif.). Shipley S1813 and chrome developer were purchased from Microchem Corp (Westborough, Mass.). Hydrofluoric acid (HF) was purchased from VWR (Radnor, Pa.). Octyldimethylchlorosilane (ODCS) and Tridecafluoro-1,1,2,2-tetrahydrooctyldimethylchlorosilane (PFDCS) were purchased from Gelest (Morrisville, Pa.). Anhydrous toluene was purchased from Sigma Aldrich (St. Louis, Mo.). DPhPC was purchased from Avanti Polar Lipids (Alabaster, Ala.), α-hemolysin was purchased from List Biological Laboratories (Campbell, Calif.). $H_2SO_4$, $H_2O_2$ and potassium chloride were purchased from EMD Millipore (Billerica, Mass.). Acetone, toluene and HEPES were purchased from Fisher Scientific (Pittsburgh, Pa.). Nitric acid was purchased from Macron Fine Chemicals (Center Valley, Pa.). Ethanol was purchased from Decon Laboratories, Inc (King of Prussia, Pa.). A PDMS sheet was purchased from Stockwell Elastomerics, Inc (Philadelphia, Pa.). N-decane was purchased from ACROS organics (Morris Plains, N.J.).

Valve Fabrication

Valve designs were printed on acrylic films by CAD/Art Services (Bandon, Oreg.). Shipley S1813 was spun on top of a chrome layer on a Borofloat® borosilicate glass slide. Valve designs were transferred to the S1813 layer using standard photolithography. The pattern was developed into the chrome layer using a chrome developer. The whole substrate was then etched in 48% HF (6 min for the channel slide, and 15 min for the displacement chamber slide). The remaining S1813 was removed using acetone and the remaining chrome was lifted off using chrome developer.

Surface Modification

The surface modification procedure was adapted from a solution phase modification. Briefly, etched valve slides were cleaned in 7:3 (v/v) $H_2SO_4$:$H_2O_2$ for 5 min, and rinsed with nanopure water. The slides were then soaked in 1M HNO₃ for 1 hr. After surface activation, the slides were rinsed with water and acetone, and dried with Ar. The activated slides were further dried in an oven at 110° C. for 1 hour. The dried substrates were soaked overnight in 2% (v/v) OPCS or PFDCS in anhydrous toluene solution. Modified substrates were cleaned in toluene, followed by acetone, water and ethanol via sonication, and then dried with Ar. Substrates were further dried at 60° C. for 1 hour.

Valve Assembly, Filling, and Characterization

Valve slides were cleaned with water and ethanol before assembly. Holes where punched through a PDMS diaphragm, and the diaphragm was sandwiched between the channel slide and the displacement chamber slide. The assembled valve was filled with 1M KCl, 5 mM HEPES, pH=7.4. A HEKA patch amplifier EPC-8 was used to measure the current across the valve. An Ag/AgCl electrode was placed in a male luer fitting, and another electrode was placed in a PTFE washer. The current signal across the valve was measured by applying 10 mV potential across the electrodes.

Valve characterizations were obtained from the current vs. time plots. The closed valve resistance was determined from current vs. voltage curve, which was obtained by applying voltage ranging from –100 mV to 100 mV across the closed valve in 10 mV increments. The opening time was calculated from the time needed to open the valve from 10% to 90%, disregarding the increasing features. Similarly, the closing time is the time it takes for the valve to close from 90% to 10%.

Valve Stability Measurements

Valves were assembled and evaluated prior to use. Closed valve resistance was measured after every ten cycles of operation until 40 cycles. The calculated resistances were normalized to the highest resistance for each type of valve.

Pipette Fabrication

Borosilicate capillaries (O.D. 1.5 mm, I.D. 1.0 mm, World Precision Instruments, Sarasota, Fla.) were pulled into pipettes with P-97 micropipette puller (Sutter Instrument, Novato, Calif.). The pipette tips were then cut and fire polished by F-500 micro-forge (Technical Products International, St. Louis, Mo.) to a final inner diameter of 20 μm. The pipettes were then surface modified with PFDCS via gas silanization.

BLM Formation and Ion Channel Reconstitution

DphPC was dissolved in CHCl₃, dried under Ar, and then lyophilized (Labconco, Kansas City, Mo.) overnight. Dried lipid was re-suspended in n-decane to a final concentration of 10 mg/mi. The micropipette was back filled with a testing solution (1M KCl, 5 mM HEPES, pH=7.4). BLMs were formed across pipette tips via tip-dip method. Briefly, 1 μl of the DPhPC suspension was applied to the tip of the pipette. The pipettes were raised and lowered across the solution surface multiple times, to facilitate the formation of the BLM. The formation of the BLM was confirmed by the presence of transient pores formed at high potentials. About 0.5 μg of α-HL was added to the solution bath (350 μl) close to the pipette tip. A –40 mV holding potential was applied across the bilayer, and α-HL insertions were indicated by 1 nS increase in bilayer conductance.

Data Analysis

All electrophysiology data was acquired using HEKA EPC 8 with Patchmaster software, and filtered at 1 kHz. The rms noise was calculated from the steady state current signal of the valves. The valves were kept open or closed until the current signal stabilized. One second of steady state current signal was used to calculate the rms noise.

RESULTS

Valve Characterization

Current signal across the valve is used as the handle to characterize valve operation since electrical resistance is most important for electrophysiology application. The equation for calculating the resistance of fluid in a rectangular channel is:

$$r = \frac{4\eta L}{(wd)^2 F} \quad (1)$$

where r is the resistance, η is the viscosity of the fluid, L is the length of the channel, w and d are the half width and half depth of the channel, and F is the geometric factor. Since the viscosity, the length, and the width of the channel are constant, then the resistance of the fluid is inversely proportional to $d^2$. This means that the resistance of the channel will increase when the depth of the channel at the valve position decreases.

Figure 8:
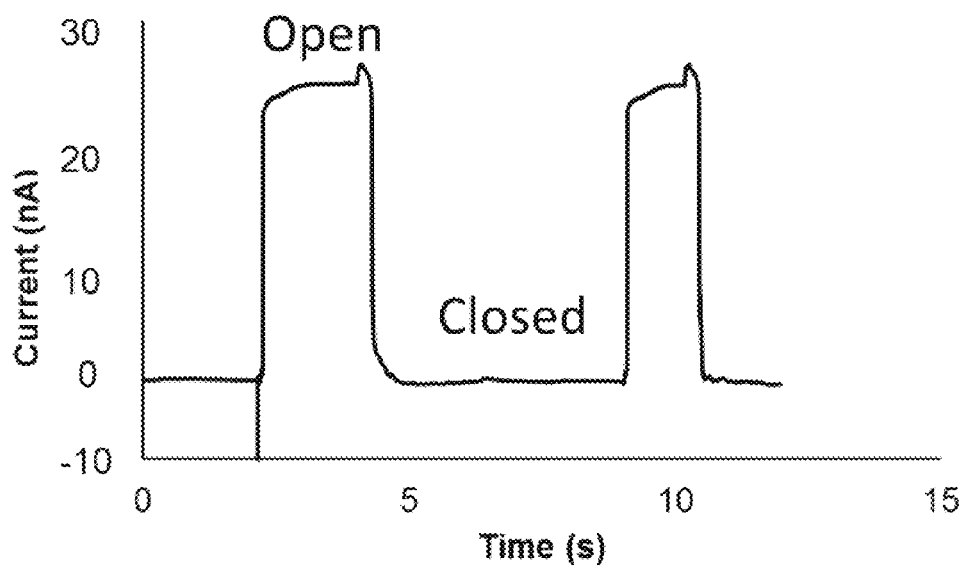
FIG. 8 shows a current signal resulting from valve operation. A current increase is observed when the valve is being opened, and a current decrease is observed when the valve is being closed.

As shown in FIG. 8, when vacuum was applied to the displacement chamber, the valve opened and an increase in current signal was observed. Similarly, when the valve was closed with pressure, the decrease in channel depth led to a decrease in current signal.

Figure 9:
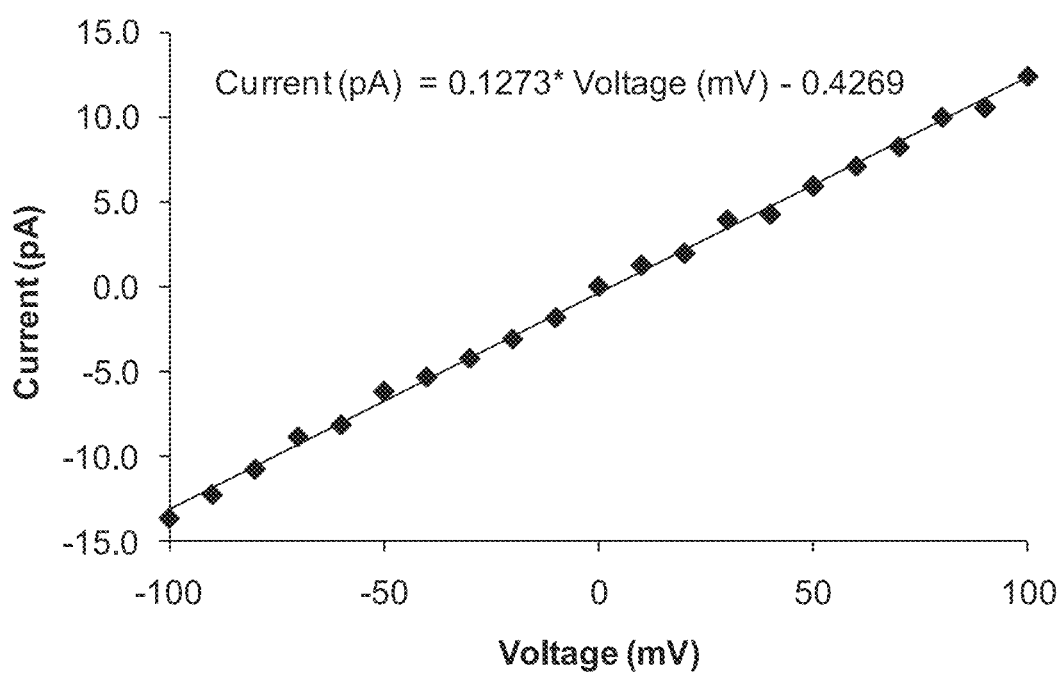
FIG. 9 shows a current vs. voltage graph of the closed valve. To test the seal resistance of the valve, an increasing voltage ranging from −100 mV to 100 mV was applied across the closed valve in 10 mV increments. The reciprocal of the slope is the resistance across the valve, which is about 7.7 GΩ for this particular valve assembly.

Referring to FIG. 9, to measure the electrical resistance of the valve, an increasing voltage ranging from –100 mV to 100 mV were applied across the closed valve in 10 mV increment. Then, detected current was plotted against the applied voltages, and the closed valve resistance was obtained from the reciprocal of the slope of IV plots.

For non-surface-modified valves, the typical electrical resistance is about 7±3 GΩ. Without wishing to limit the invention to a particular theory or mechanism, the low resistance may be caused by the mismatch in surface hydrophobicity between the glass layers and the PDMS diaphragm. As shown in FIG. 5, the water contact angle for the glass valve layers and the PDMS diaphragm were measured. After all the microfabrication processes, the borosilicate glass had a water contact angle of about 70±4°, whereas the water contact angle for the PDMS diaphragm was measured to be about 107±1°. A more hydrophobic surface will have a higher water contact angle. Since the glass substrate is more hydrophilic, the aqueous solution may be retained between the glass substrate and the PDMS diaphragm even when the valve is closed. The presence of this thin aqueous layer can cause current leakage, which can lower the electrical resistance of the valve.

For BLM electrophysiological measurements, the resistance of the bilayer is usually around 10 GΩ. In order to obtain low noise recordings, the resistance of the valve must be significantly higher than that of the lipid bilayer. Referring to FIG. 1C, modification of the glass surface with octyl- and perfluoro-dimethylchlorosilane provided a better seal, as well as decreasing the surface energy of the glass slides to more closely match it with the surface energy of the PDMS. Further still, the modification had no adverse effects on the function of the valves. The silanized glass substrates had an increased hydrophobicity, which could eliminate the thin aqueous layer and also strengthen the interaction between the valve glass and the PDMS diaphragm, both of which will contribute to better electrical resistance of the valve. After surface modification, the water contact angle of the glass substrate increased to about 92±3° for the ODCS-modified glass, and to about 99±3° for the PFDCS-modified glass, as shown in FIG. 5, which more closely matched that of the PDMS.

Figure 10A:
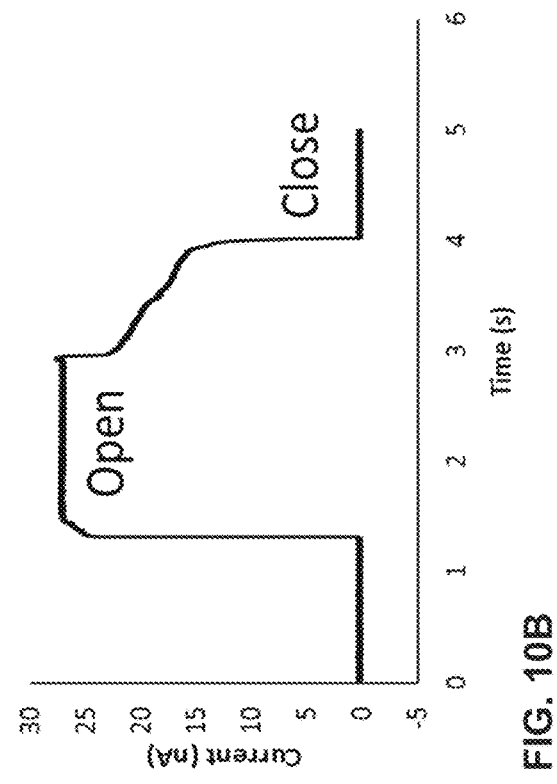
FIGS. 10A and 10B show current vs. time trace for an ODCS-modified valve (FIG. 10A) and a PFDCS-modified valve (FIG. 10B). Three-step closing feature was observed for both valves.
Figure 10B:
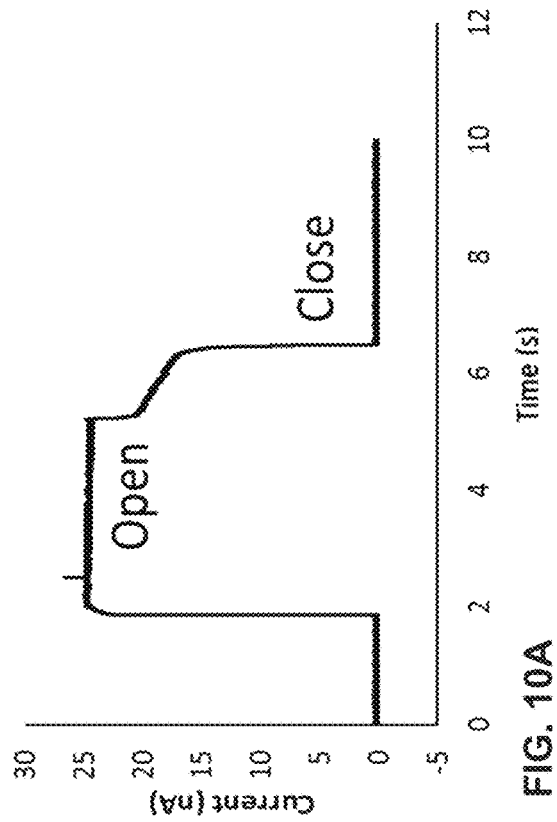

Referring to FIGS. 10A and 10 B, the performances of the surface modified valves were evaluated. The current across the valves was monitored during valve operation. A three-step closing feature was observed for both surface modified valves, which had never been observed in unmodified valves. Without wishing to limit the invention to a particular theory or mechanism, this may be due to the reinforced interaction between the modified glass and the PDMS diaphragm.

Figure 11A:
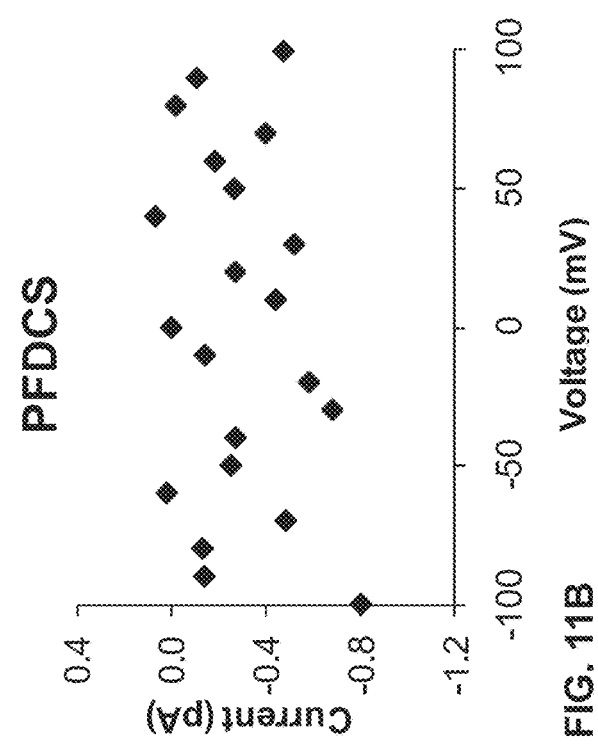
FIGS. 11A and 11B show representative traces for current vs. voltage plots for an ODCS-modified valve (FIG. 11A) and a PFDCS-modified valve (FIG. 11B), Both plots show random scattering of detectable current under increasing voltage, which indicates that the current is too low to be reliably detected by the patch clamp system. Therefore, the surface silanization greatly increased the seal resistance of the modified valves.
Figure 11B:
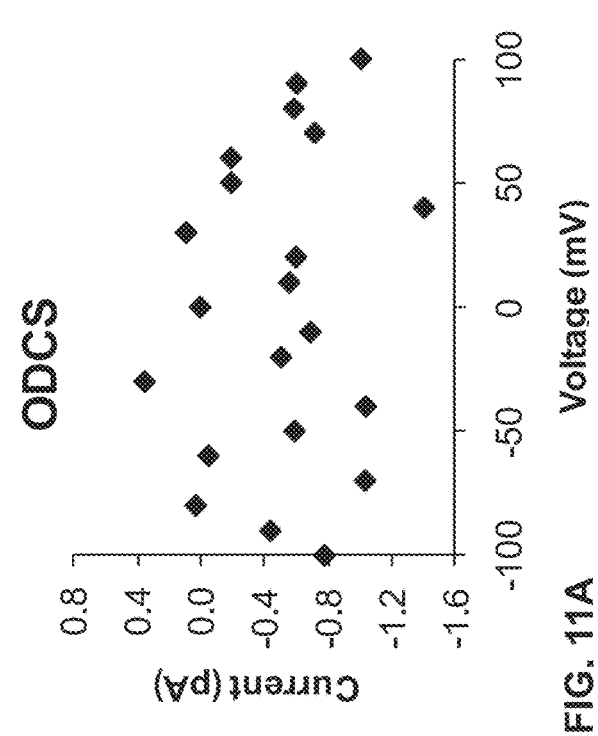

The electrical resistances of the modified valves were measured in the same manner as those of the unmodified valves. As shown in FIGS. 11A and 11B, the detectable current showed random scattering pattern with increasing applied voltage, which indicated that the amount of leak current was lower than the detection limit of the patch clamp system.

The opening and the closing time of the surface modified valves are characterized and summarized in Table 1. The opening time of the valve is the time it takes for the valve to open from 10% to 90% (characterized by current signal). Similarly, the closing time is the time for the valve to close from 90% to 10%. Surface modification greatly reduced the opening time of the valves from 30 ms to 6 ms. This may be due to the sharper opening achieved by the surface modified valves. The closing times of the modified valves are much longer than that of the unmodified valve, which is mainly due to the step-wise closing. However, both surface modified valves can be closed around 1 second.

TABLE 1

Characterization of unmodified and modified valves.

| Characteristics | Unmodified Valve | ODCS Modified Valve | PFDCS Modified Valve |
|---|---|---|---|
| Electrical resistance (GΩ) | 7 ± 3 | >500 | >500 |
| Opening Time (ms) | 30 ± 20 | 6 ± 3 | 5 ± 2 |
| Closing Time (ms) | 150 ± 30 | 1180 ± 490 | 980 ± 350 |

As shown on FIG. 12, the surface modified valves were also tested for their stability over operation cycles. The valve resistance was consistent over 40 cycles of operation. Without wishing to limit the invention to a particular theory or mechanism, the valves can be stable for at least 40 cycles of operation, which is sufficient for performing electrophysiological measurements.

Referring to Table 2, the noise level was analyzed by calculating the rms noise over one second of steady-state current at both open and closed valve configurations. Current traces were obtained using 0.5 mV/pA gain to avoid signal saturation when the valve was open. Upon surface modification, the noise of the valve was reduced in both open and closed states.

TABLE 2

Rms noise of unmodified and modified valves in closed and open states.

| rms noise | unmodified valve | ODCS modified valve | PFDCS modified valve |
|---|---|---|---|
| Close | 13 ± 4 pA | 11 ± 2 pA | 8 ± 3 pA |
| Open | 33 ± 3 pA | 16 ± 4 pA | 13 ± 6 pA |

Isolating Electrophysiological Signals

Valve performance was further evaluated with electrophysiological signals. This was accomplished by incorporating a PFDCS-modified glass micro-pipette into the system. The pipette had a tip diameter of 20 μm, and was placed tip down right above the PTFE reservoir with its tip submerged in the bath solution. Then, a BLM was formed across the pipette tip, and α-hemolysins were reconstituted into the BLM as model ion channels. The α-hemolysins are bacteria toxins that form non-selective pores in lipid bilayers. Therefore, their insertions will result in step-wise increases in current signal under fixed potential.

The insertions of α-hemolysin were monitored at −40 mV holding potential (FIG. 13A). Each insertion resulted in a ca. −40 pA increase in current signal (FIG. 13B), which was equivalent to ca. 1 nS increase in membrane conductance. Valve operation was conducted after the electrophysiological signal stabilized. FIG. 13C showed the current recording of valve operation with α-hemolysins already inserted into the BLM. As shown in FIG. 13D, when the valve was open, a −520 pA current resulting from 13 α-hemolysin insertions could be monitored. When the valve was closed, the mean value of the detectable current was calculated to be 0.003 pA, which was beyond the detection limit of the patch clamp system.

It has been shown and described herein that the surface modification greatly increased the electrical resistance of the valve, and lowered the steady-state noise level. The valve was shown to be stable over 40 cycles of operation, and was used to successfully isolate electrophysiological signals. In some embodiments, since the noise level of the surface modified valves were ca. 10 pA, the valves would be suited for rapid conductance measurements on multiple ion channels.

Although the present invention has been described in the aforementioned section as being used in biochemical analysis, the present invention is also applicable for use in other fields such as high throughput screening for chemical analysis or chemical processing.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not intended in any way to limit the scope of the claims to the particular features having the corresponding reference numbers in the drawings. In some embodiments; the figures presented in this patent application are drawn to scale, including the angles, ratios of dimensions, etc. In some embodiments, the figures are representative only and the claims are not limited by the dimensions of the figures. In some embodiments; descriptions of the inventions described herein using the phrase "comprising" includes embodiments that could be described as "consisting of", and as such the written description requirement for claiming one or more embodiments of the present invention using the phrase "consisting of" is met.

REFERENCES (1) White, A. K.; VanInsberghe; M.; Petriv, O. I.; Hamidi, M.; Sikorski, D.; Marra, M. A.; Piret, J.; Aparicio, S.;

Hansen, C. L. High-Throughput Microfluidic Single-Cell RT-qPCR, *Proc. Natl, Acad. Sci. U.S.A* 2011, 108, 13999-14004.

(2) Liu, J.; Enzelberger, M.; Quake, S. A Nanoliter Rotary Device for Polymerase Chain Reaction. *Electrophoresis.* 2002, 23; 1531-1536.

(3) Zhang, Y.; Park, S.; Yang, S.; Wang, T. H. An All-in-one Microfluidic Device for Parallel DNA Extraction and Gene Analysis. *Biomed, Microdevices.* 2010, 12, 1043-1049.

(4) Paegel, B. M.; Blazej, R. G.; Mathies, R. A. Microfluidic Devices for DNA Sequencing: Sample Preparation and Electrophoretic Analysis. *Curr. Opin, Biotechnol.* 2003, 14, 42-50.

(5) Wheeler, A. R.; Throndset, W. R.; Whelan; R. J.; Leach, A. M.; Zare, R. N.; Liao, Y. H.; Farrell, K.; Manger, I. D.; Daridon, A. Microfluidic Device for Single-Cell Analysis. *Anal. Chem.* 2003, 75, 3581-3586.

(6) Grabowski, M.; Buchenauer, A.; Hasni, A. E.; Klockenbring, T.; Barth, S.; Mokwa, W.; Schnakenberg, U. Microfluidic System for Cell Fusion. *Procedia Eng.* 2010, 5, 1332-1335.

(7) Shameli; S. M.; Ren, C. L. Microfluidic Two-Dimensional Separation of Proteins Combining Temperature Gradient Focusing and Sodium Dodecyl Sulfate-Polyacrylamide Gel Electrophoresis. *Anal. Chem.* 2015, 87, 3593-3597.

(8) Sarkar, A.; Hou; H. W.; Mahan, A. E.; Han, J.; Alter; G. Multiplexed Affinity-Based Sepaation of Proteins and Cells Using Inertial Microfluidics. *Sci. Rep.* 2016, 6, 23589.

(9) Oh, K. W.; Ahn, C. H. A Review of Microvalves. *J. Micromech. Microeng.* 2006, 16, R13-R39.

(10) Jacobson, S. C.; Ermakov, S. V.; Ramsey, J. M. Minimizing the Number of Voltage Sources and Fluid Reservoirs for Electrokinetic Valving in Microfluidic Devices. *Anal. Chem.* 1999, 71, 3273-3276.

(11) Leach, A. M.; Wheeler, A. R.; Zare, R. N. Flow Injection Analysis in a Microfluidic Format. *Anal. Chem.* 2003, 75, 967-972.

(12) Guo, Z. X.; Zeng, Q.; Zhang, M.; Hong, L. Y.; Zhao, Y. F.; Liu, W.; Guo, S. S.; Zhao, X. Z. Valve-Based Microfluidic Droplet Micromixer and Mercury (II) Ion Detection, *Sens. Actuators, A.* 2011, 172, 546-551.

(13) Li, N.; Hsu, C. H.; Folch, A. Parallel Mixing of Photolithographically Defined Nanoliter Volumes Using Elastomeric Microvalve Arrays. *Electrophoresis.* 2005, 26, 3758-3764.

(14) Sundararajan, N.; Kim, D.; Berlin, A. A. Microfluidic Operations Using Deformable Polymer Membranes Fabricated by Single Layer Soft Lithography. *Lab Chip.* 2005, 5, 350-354.

(15) Fu, A. Y.; Chou, H. P.; Spence, C.; Arnold, F. H.; Quake, S. R. An Integrated Microfabricated Cell Sorter. *Anal. Chem.* 2002, 74, 2451-2457.

(16) Unger, M. A.; Chou, H.; Thorsen, T.; Scherer, A.; Quake, S. R. Monolithis Microfabricated Valves and Pumps by Multilayer Soft Lithography. *Science.* 2000, 288, 113-116.

(17) Kim, J.; Kang, M.; Jensen, E. C.; Mathies, R. A. Lifting Gate PDMS Microvalves and Pumps for Microfluidic Control. *Anal. Chem.* 2012, 84, 2067-2071.

(18) Schasfoort, R. B. M.; Schlautmann, S.; Hendrikse, J.; van den Berg, A. Field-Effect Flow Control for Microfabricated Fluidic Networks. *Science.* 1999, 286, 942-945.

(19) Kirby, B. J.; Shepodd, T. J.; Hasselbrink Jr., E. F. Voltage-Addressable On/OFF Microvalves for High-Pressure Microchip Separations. *J. Chromatogr. A.* 2002, 979, 147-154.

(20) Zhang, W.; Lin, S.; Wang, C.; Hu, J.; Li, C.; Zhuang, Z.; Zhou, Y.; Mathies, R. A.; Yang, C. J. PMMA/PDMS Valves and Pumps for Disposable Microfluidics. *Lab Chip.* 2009, 9, 3088-3094.

(21) Gu, P.; Liu, K.; Chen, H.; Nishida, T.; Fan, Z. H. Chemical-Assisted Bonding of Thermoplastics/Elastomer for Fabricating Microfluidic Valves, *Anal. Chem.* 2011, 83, 446-452.

(22) Kim, J. H.; Na, K. H.; Kang, C. J.; Jeon, a; Kim, Y. S. A Disposable Thermopneumatic-Actuated Microvalve Stacked with PDMS Layers and ITO-Coated Glass. *Microelectron. Eng.* 2004, 73-74, 864-869.

(23) Yang, X.; Grosjean, C.; Tai, Y. C.; Ho, C. M. A MEMS Thermopneumatic Silicone Rubber Membrane Valve. *Sens. Actuators, A.* 1998, 64, 101-108.

(24) Kartalov; E. P.; Maltezos, G.; Anderson; W. F.; Taylor, C. R; Scherer, A. Electrical Microfluidic Pressure Gauge for Elastomer Microelectrochemical Systems. *J. Appl. Phys.* 2007, 102, 84909-849094.

(25) Chen, H.; Gu, W.; Cellar, N.; Kennedy; R.; Takayama, S.; Meiners, J.-C. Electromechanical Properties of Pressure-Actuated PDMS Microfluidic Push-Down Valves. *Anal. Chem.* 2008, 80, 6110-6113.

(26) Chen, C-Y.; Chen, C-H.; Tu, T-Y.; Lin, C-M.; Wo, A. M. Electrical Isolation and Characteristics of Permanent Magnet-Actuated Valves for PDMS Microfluidics. *Lab Chip.* 2011, 11, 733-737.

What is claimed is:

1. An electrically insulating valve (105) in an electrochemical measurement system, said valve (105) comprising:
   a) a valve seat (118) disposed on a glass surface (112) and separating a first fluid channel (114) from a second fluid channel (116), the valve seat (118) comprising a seat surface (119) having a surface modification; and
   b) a polymer membrane portion (140) disposed adjacent to the valve seat (118);
   wherein the surface modification increases a hydrophobicity and electrical resistance of the glass surface (112), as compared to a non-surface-modified glass surface, thereby minimizing a native water layer at the seat surface (119),
   wherein closing the valve by interacting the polymer membrane portion (140) with the modified seat surface (119) of the valve seat (118) forms a tight, hydrophobic and high-electrical resistance seal (100), thereby decreasing a noise level during measurement of an electrochemical signal.

2. The valve (105) of claim 1, further comprising a second glass surface (132) disposed adjacent to the polymer membrane portion (140) such that the polymer membrane portion (140) is interposed between the glass surfaces (112, 132), wherein the second glass surface (132) has a displacement chamber (134) recessed therein, wherein the displacement chamber (134) is superimposed over the polymer membrane portion (140) and the valve seat.

3. The valve (105) of claim 2, wherein the second glass surface (132) comprises a surface modification.

4. The valve (105) of claim 1, wherein the surface modification is effective for imparting a water contact angle greater than 90° to the glass surface (112).

5. The valve (105) of claim 1, wherein the polymer membrane portion (140) comprises a flexible polydimethylsiloxane, polytetrafluoroethylene, or polymethacrylate.

6. The valve (105) of claim 1, wherein an electrical resistance of the hydrophobic and high-electrical resistance seal is at least 500 G$\Omega$.

7. The valve (105) of claim 1, wherein the hydrophobic and high-electrical resistance seal has a noise level less than 50 pA.

8. The valve (105) of claim 1, wherein the valve (105) is biased to be in a closed position such that the valve seat (118) is normally contacting the polymer membrane portion (140), thereby forming the hydrophobic and high-electrical resistance seal (100) to obstruct flow between the first fluid channel (114) and the second fluid channel (116), wherein the valve (105) further comprises a vacuum conduit (150) having a vacuum input (152), said vacuum conduit (150) is fluidly coupled to the displacement chamber (134), wherein when a vacuum is applied to the displacement chamber (134) via the vacuum conduit (150), the valve (105) is actuated into an open position such that the polymer membrane portion (140) is pulled away from the valve seat (118) and into the displacement chamber (134), thereby breaking the hydrophobic and high-electrical resistance seal (100) and allowing for flow between the first fluid channel (114) and the second fluid channel (116), wherein when positive pressure is applied to the displacement chamber (134), the valve (105) returns to the closed position.

9. The valve (105) of claim 1, wherein the valve (105) is biased to be in an open position such that a gap (146) separates the valve seat (118) and the polymer membrane portion (140) to allow flow between the first fluid channel (114) and the second fluid channel (116), wherein the valve (105) further comprises a conduit (150) fluidly coupled to the displacement chamber (134), wherein when a positive pressure is applied to the displacement chamber (134) via the conduit (150), the valve (105) is actuated into a closed position such that the polymer membrane portion (140) contacts the valve seat (118), thereby forming the hydrophobic and high-electrical resistance seal (100) to block the flow between the first fluid channel (114) and the second fluid channel (116), wherein when the positive pressure is removed, the valve (105) returns to the open position.

10. The valve (105) of claim 1, wherein an electrical resistance of the hydrophobic and high-electrical resistance seal is stable for at least 10 cycles of valve operation such that the electrical resistance of the hydrophobic and high-electrical resistance seal in subsequent cycles is at least about 80% of the electrical resistance of the hydrophobic seal in the initial cycle.

11. The valve (105) of claim 1, wherein the valve (105) is configured for use in a microfluidic system that measures an electrophysical property of a fluid.

12. The valve (105) of claim 11, wherein the microfluidic system is a microfluidic array device, microfluidic chip, microfluidic pumping system, microfluidic network, or a microfluidic/electronic interface.

* * * * *